United States Patent
Kim et al.

(10) Patent No.: US 11,614,021 B1
(45) Date of Patent: Mar. 28, 2023

(54) SYSTEM AND METHOD FOR CONTROLLING AIR HEAT EXCHANGER OF VEHICLE

(71) Applicants: HYUNDAI MOTOR COMPANY, Seoul (KR); KIA CORPORATION, Seoul (KR)

(72) Inventors: Jae Woong Kim, Hwaseong-si (KR); Uk Il Yang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/728,145

(22) Filed: Apr. 25, 2022

(30) Foreign Application Priority Data

Sep. 28, 2021 (KR) .................. 10-2021-0128054

(51) Int. Cl.
*F01P 7/10* (2006.01)
*F01P 7/04* (2006.01)

(52) U.S. Cl.
CPC ........ *F01P 7/10* (2013.01); *F01P 7/04* (2013.01); *F01P 2025/13* (2013.01); *F01P 2025/66* (2013.01)

(58) Field of Classification Search
CPC .. F01P 7/10; F01P 7/04; F01P 2025/13; F01P 2025/66
See application file for complete search history.

(56) References Cited

U.S. PATENT DOCUMENTS

| | | | | |
|---|---|---|---|---|
| 7,347,168 | B2 * | 3/2008 | Reckels | F01P 7/167 123/41.11 |
| 2007/0261648 | A1 * | 11/2007 | Reckels | F01P 7/167 123/41.12 |
| 2011/0281515 | A1 * | 11/2011 | Lockwood | F01P 7/12 165/104.34 |
| 2015/0343892 | A1 * | 12/2015 | Kolhouse | F01P 7/12 165/287 |
| 2017/0321593 | A1 * | 11/2017 | Wolff | B60K 11/085 |
| 2019/0234291 | A1 * | 8/2019 | Cunningham | F01P 1/06 |

FOREIGN PATENT DOCUMENTS

KR 10-1620216 B1 5/2016

* cited by examiner

*Primary Examiner* — Long T Tran
(74) *Attorney, Agent, or Firm* — McDonnell Boehnen Hulbert & Berghoff LLP

(57) ABSTRACT

A system for controlling an air heat exchanger of a vehicle includes an information collector which collects environmental information including a current speed of a vehicle, a desired air mass flow rate, and an ambient temperature. A storage stores the environmental information therein. A controller calculates a driving load and a cooling load in accordance with the environmental information and calculating a control amount of an air heat exchanger, at which a cost function that is a sum of the driving load and the cooling load is minimum.

13 Claims, 4 Drawing Sheets

SYSTEM AND METHOD FOR CONTROLLING AIR HEAT EXCHANGER OF VEHICLE

CROSS REFERENCE TO RELATED APPLICATIONS

The present application claims priority to Korean Patent Application No. 10-2021-0128054, filed Sep. 28, 2021, the entire contents of which is incorporated herein for all purposes by this reference.

BACKGROUND

Field

The present disclosure generally relates to a system and method for controlling an air heat exchanger of a vehicle and, more particularly, to a system and method for controlling an air heat exchanger of a vehicle, wherein the degree of opening of an air flap of the vehicle and the number of revolutions of a cooling fan of the vehicle are simultaneously controlled with optimal values on the basis of an energy function in order to minimize a sum of the air resistance of the vehicle, which increases according to the speed of the vehicle, and the cooling load of the cooling fan, which decreases according to the speed of the vehicle contrary to the air resistance, thereby improving fuel efficiency of the vehicle and improving cooling performance of the vehicle.

Description of the Related Art

An air flap is a device coupled to a housing of a front module of a vehicle to direct or block a flow of air entering the vehicle to the engine and the chiller, such as a cooling fan or a radiator, of the vehicle.

The radiator is a device configured to circulate cooling water to absorb heat from the engine or adjust the temperature of the air within the interior of the vehicle. The cooling fan operates to dissipate heat when the temperature of the cooling water of the radiator rises. Such a chiller is generally disposed on the central portion of the front module in which head lamps, a bumper beam, etc. are fitted together. Accordingly, when the air flap is opened, a driving load occurs on the vehicle, due to friction with the road and air resistance according to an air mass flow rate. In contrast, the cooling load of the chiller is reduced due to the air entering the chiller.

However, a control system of the related art has separately controlled the air flap and the chiller according to desired outputs and various control variables required by the vehicle and respective devices of the vehicle. Therefore, for control optimized for fuel efficiency, a system controlling the air flap and the chiller in concert is required.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a system and method for controlling an air heat exchanger of a vehicle, wherein the degree of opening of an air flap of the vehicle and the number of revolutions of a cooling fan of the vehicle are simultaneously controlled with optimal values on the basis of an energy function in order to minimize a sum of the air resistance of the vehicle, which increases according to the speed of the vehicle, and the cooling load of the cooling fan, which decreases according to the speed of the vehicle contrary to the air resistance, thereby improving fuel efficiency of the vehicle and improving cooling performance of the vehicle.

In order to achieve the above objective, according to an embodiment of the present disclosure, there is provided a system for controlling an air heat exchanger of a vehicle. The system may include an information collector collecting environmental information including a current speed of a vehicle, a desired air mass flow rate, and an ambient temperature, a storage storing the environmental information therein, and a controller calculating a driving load and a cooling load in accordance with the environmental information and calculating a control amount of an air heat exchanger, at which a cost function that is a sum of the driving load and the cooling load is minimum.

The air heat exchanger may include an air flap configured to direct or block a flow of air entering the vehicle toward a heat radiator of the vehicle and a cooling fan configured to dissipate heat from the heat radiator. The controller may calculate a degree of opening of the air flap and the control amount of the cooling fan.

The controller may calculate the control amount of the air heat exchanger as a duty valve of a switching device that turns power of the air heat exchanger on or off.

When the current speed of the vehicle is equal to or higher than a first vehicle speed, the controller may calculate the control amount of the air heat exchanger.

The controller may calculate the driving load by Equation 1 and the cooling load by Equation 2, $$P_{driving} = \frac{1}{2}\rho C_d A V^2 + O_{th},$$ Equation 1 where $P_{driving}$ is the driving load, $\rho$ is a density of the air, $c_d$ is a drag coefficient, A is a projected area of the vehicle, V is a speed of the vehicle, $O_{th}$ is a threshold value of the driving load, and $$P_{fan} = a\dot{m}_{air}^2 + b\dot{m}_{air} + cV'_{spd}{}^2 + dV'_{spd} + e$$ Equation 2:

where $P_{fan}$ is the cooling load, main is an air mass flow rate equal to or greater than the desired air mass flow entering the heat exchanged in the vehicle, $V_{spd}$ is the speed of the vehicle, and a, b, c, d, and e are constants.

The density of the air in the Equation 1 may be determined according to the ambient temperature, and the drag coefficient in the Equation 1 may be determined according to the control amount of the air heat exchanger.

The air mass flow rate in the Equation 2 may be determined according to the speed of the vehicle and an operating speed of the cooling fan.

The controller may estimate a future speed of the vehicle during a first time after a current point in time in accordance with the environmental information, and calculate the control amount of the air heat exchanger, at which the sum of the cost function during the first time is minimum, in accordance with the environmental information and the future speed of the vehicle.

The controller may further include a communication part by which sensing data regarding surroundings of the vehicle processed by a V2X application server is exchanged. The controller may estimate a future speed of the vehicle during a first time after the current point in time in accordance with the sensing data regarding the surroundings of the vehicle exchanged by the communication part, and calculate the control amount of the air heat exchanger, at which the sum of the cost function during the first time is minimum, in accordance with the environmental information and the future speed of the vehicle.

The controller may estimate the future speed of the vehicle using a Kalman filter algorithm.

According to another embodiment of the present disclosure, there is provided a method of controlling an air heat exchanger of a vehicle. The method may include measuring, by an information collector, environmental information including a current speed of a vehicle, a desired air mass flow rate, and an ambient temperature, storing the environmental information in a storage; calculating, by a controller, a driving load and a cooling load in accordance with the environmental information, and calculating a control amount of an air heat exchanger, at which a cost function that is a sum of the calculated driving load and the calculated cooling load is minimum.

In the calculation of the control amount, the air heat exchanger may include an air flap configured to direct or block a flow of air entering the vehicle toward a heat radiator of the vehicle and a cooling fan configured to dissipate heat from the heat radiator, and the controller may calculate a degree of opening of the air flap and the control amount of the cooling fan.

In the calculation of the control amount, the controller may calculate the control amount of the air heat exchanger as a duty valve of a switching device that turns power of the air heat exchanger on or off.

In the calculation of the driving load and the cooling load, the controller may calculate the driving load by Equation 1 and the cooling load by Equation 2, $$P_{driving} = \frac{1}{2}\rho C_d A V^2 + O_{th},\qquad \text{Equation 1}$$

where $P_{driving}$ is the driving load, $\rho$ is a density of the air, $c_d$ is a drag coefficient, A is a projected area of the vehicle, V is a speed of the vehicle, 0th is a threshold value of the driving load, and $$P_{fan}=a\dot{m}_{air}^2+b\dot{m}_{air}+cV'_{spd}^2+dV'_{spd}+e \qquad \text{Equation 2:}$$

where $P_{fan}$ is the cooling load, $m_{air}$ is an air mass flow rate equal to or greater than the desired air mass flow entering the heat exchanged in the vehicle, $V_{spd}$ is the speed of the vehicle, and a, b, c, d, and e are constants.

The calculation of the control amount may include: estimating a future speed of the vehicle during a first time after a current point in time in accordance with the environmental information, and calculating the control amount of the air heat exchanger, at which the sum of the cost function during the first time is minimum, in accordance with the environmental information and the future speed of the vehicle.

The calculation of the control amount may include: estimating a future speed of the vehicle in accordance with sensing data regarding surroundings of the vehicle processed by a V2X application server; and calculating the control amount of the air heat exchanger, at which the sum of the cost function during the first time is minimum, in accordance with the environmental information and the future speed of the vehicle.

According to the present disclosure, the system and method for controlling an air heat exchanger of a vehicle can simultaneously control the degree of opening of an air flap of the vehicle and the number of revolutions of a cooling fan of the vehicle to have optimal values on the basis of an energy function in order to minimize a sum of the air resistance of the vehicle, which increases according to the speed of the vehicle, and the cooling load of the cooling fan, which decreases according to the speed of the vehicle contrary to the air resistance, thereby improving fuel efficiency of the vehicle and improving cooling performance of the vehicle.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure. Hereinafter, embodiments of the present disclosure will be described in detail with reference to the accompanying drawings.

Figure 1:
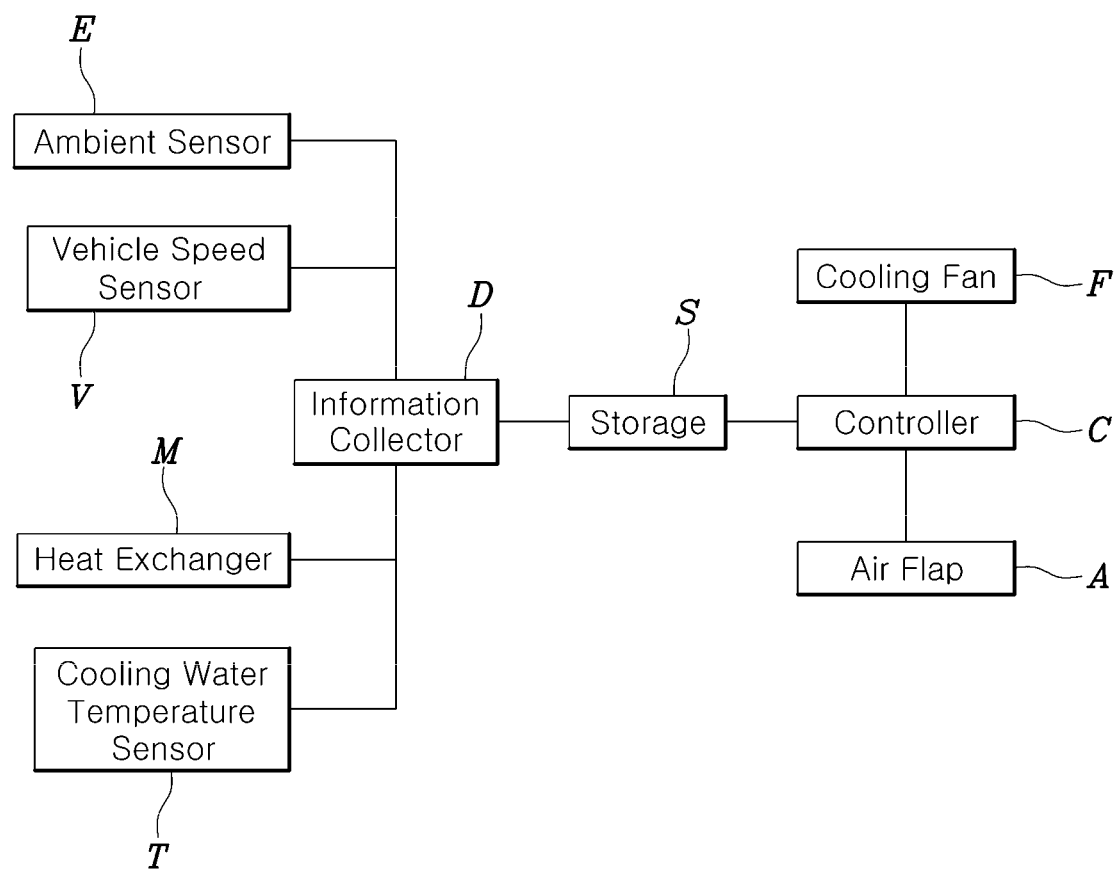
FIG. 1 is a block diagram illustrating the configuration of a system for controlling an air heat exchanger of a vehicle according to an embodiment of the present disclosure.
Figure 2:
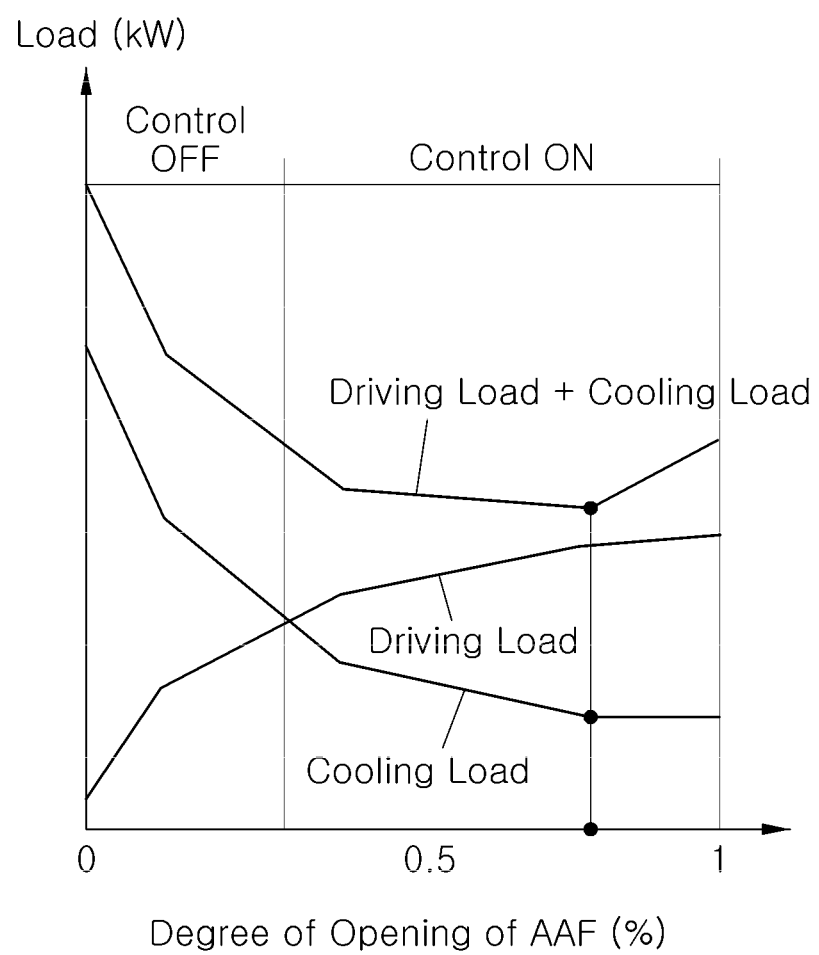
FIGS. 2 and 3 are graphs illustrating the mechanism of the system for controlling an air heat exchanger of a vehicle according to an embodiment of the present disclosure.
Figure 3:
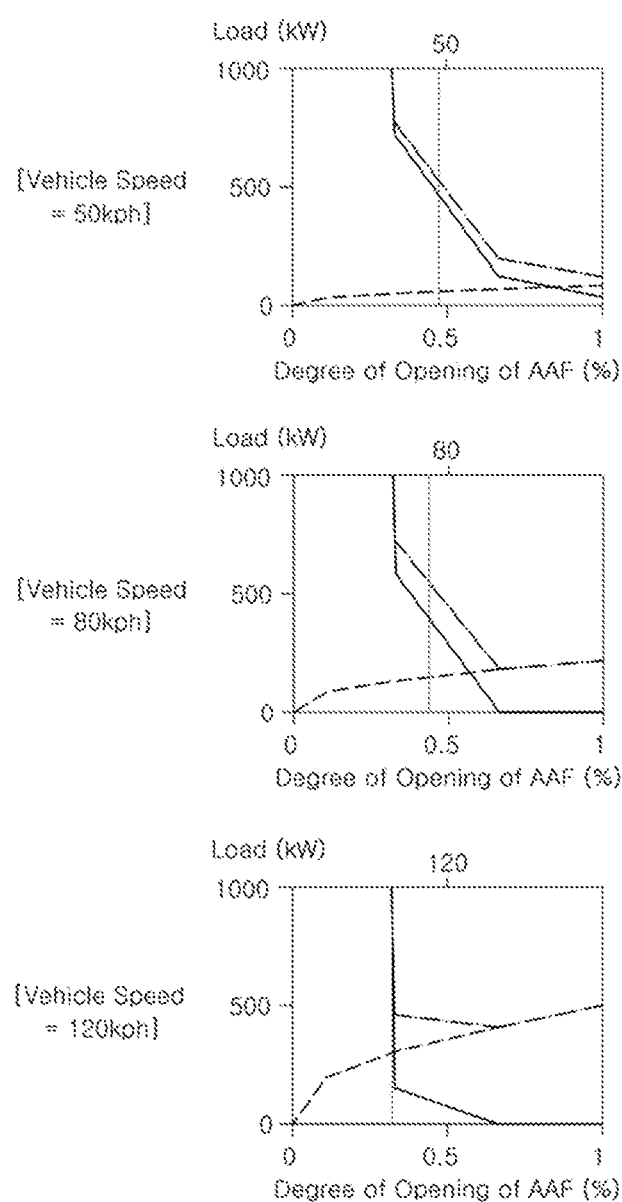
Figure 4:
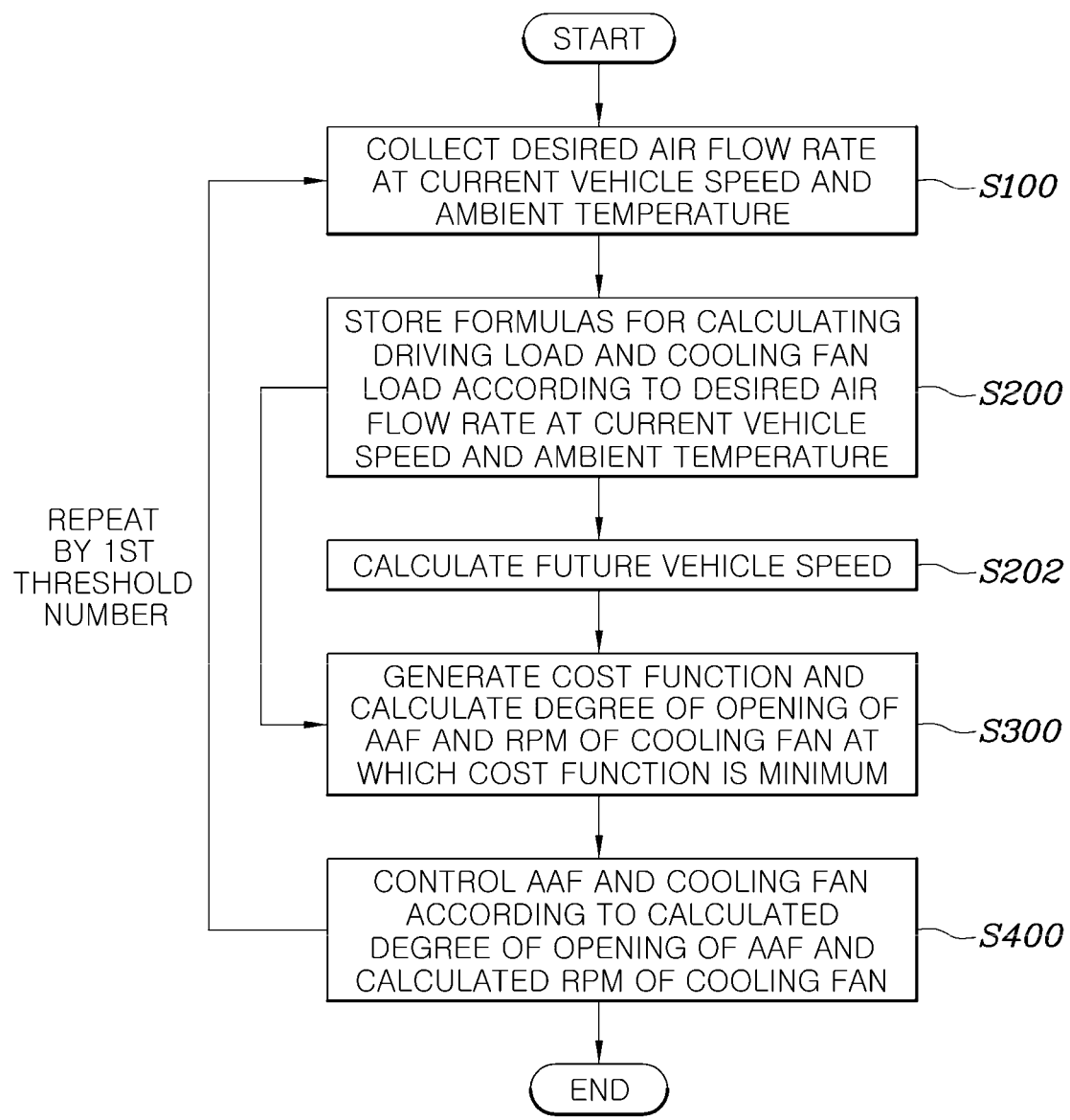
FIG. 4 is a flowchart illustrating a method for controlling an air heat exchanger of a vehicle according to an embodiment of the present disclosure.

FIG. 1 is a block diagram illustrating the configuration of a system for controlling an air heat exchanger of a vehicle according to an embodiment of the present disclosure, FIGS. 2 and 3 are graphs illustrating the mechanism of the system for controlling an air heat exchanger of a vehicle according to an embodiment of the present disclosure, and FIG. 4 is a flowchart illustrating a method for controlling an air heat exchanger of a vehicle according to an embodiment of the present disclosure.

FIG. 1 is a block diagram illustrating the configuration of a system for controlling an air heat exchanger of a vehicle according to an embodiment of the present disclosure. The system includes an information collector measuring environmental information including a current vehicle speed, a desired air mass flow rate, and an ambient temperature. The system further includes a storage storing the environmental information therein, and a controller calculating a driving load and a cooling load on the basis of the environmental information and calculating a control amount of the air heat exchanger, at which a cost function that is a sum of the driving load and the cooling load is minimum. That is, an embodiment of the present disclosure cools a vehicle while adjusting the air mass flow rate at a level at which the sum of the driving load and the cooling load is minimum.

The information collector D collects the environmental information regarding the current vehicle speed and the ambient temperature of the vehicle from, e.g., sensors measuring the current vehicle speed and the ambient temperature of the vehicle. In addition, the information collector D collects the environmental information regarding the calculated desired air mass flow rate, i.e., air mass flows required by respective devices of the vehicle. In addition, the environmental information is collected at predetermined time intervals or continuously and then stored in the storage S. In addition, the controller C calculates air resistance (or drag) according to the current speed of the vehicle and the output of the air heat exchanger configured to cool the respective devices and the interior of the vehicle using the air, i.e. the driving load and the cooling load, on the basis of the stored environmental information. Lastly, the controller C calculates the cost function by summing the driving load and the cooling load calculated as above and calculates a solution of the control amount of an air treatment device, at which the cost function is minimum.

Here, the air heat exchanger includes devices adjusting the flow rate of the air and cooling the vehicle using the adjusted air, i.e., an opening/closing device configured to open and close a path through which the air enters the vehicle and an air-cooled chiller. The opening/closing device includes an air flap. The air flap is a device coupled to a housing of a front module of the vehicle and configured to direct or block a flow of air entering the vehicle toward the engine or the chiller, such as a cooling fan or a radiator, of the vehicle. The air flap includes an active air flap (AAF), i.e., an air flap configured to actively adjust the degree of opening in order to adjust the driving load caused by the air resistance during driving. The air-cooled chiller includes a cooling fan. The cooling fan is a device configured to dissipate heat generated by the engine or the battery inside the vehicle or heat introduced into the interior of the vehicle from the outside. When the radiator circulating cooling water to dissipate such heat is used, the cooling may also cool the radiator and dissipate heat using the air entering the vehicle.

In addition, the information collector D may be sensors measuring the current speed of the vehicle and the ambient temperature of the vehicle. The information collector D may be a speed sensor, such as a Haul effect sensor, a light sensor, or a magnetic sensor, and an air temperature sensor, such as a thermometer, a thermocouple, a resistance thermometer (RTD), an infrared (IR) sensor, or a diode. In addition, the information collector may be a non-sensor device configured to collect the current speed of the vehicle and the environmental information regarding the ambient temperature (e.g., environmental information received from a separate speedometer, a separate IR-based temperature thermometer, or a communication part or read from the storage).

In addition, the storage S may be a memory storing the environmental information therein. The storage S may be implemented as a read only memory (ROM), a volatile memory as a random access memory (RAM), such as dynamic RAM (DRAM) or a static RAM (SRAM); a non-volatile memory, such as a resistive RAM (ReRAM), a phase-change RAM (PRAM), or a not- and (NAND) flash memory, a storage medium, such as a hard disk drive (HDD), a compact disc read-only memory (CD-ROM), a digital versatile disc (DVD), a memory card (e.g., a multimedia card (MMC), an embedded multi-media card (eMMC), a secure digital (SD) card, or a micro SD card), or a combination thereof. In addition, a plurality of storages may be employed.

The air flap is a device coupled to the housing of the front module of the vehicle to direct or block a flow of air entering the vehicle to the engine and a chiller, such as a cooling fan or a radiator, of the vehicle.

The radiator is a device configured to circulate cooling water so as to absorb heat from the engine or adjust the air temperature inside the vehicle. The cooling fan operates to dissipate heat when the temperature of the cooling water in the radiator rises. Such a chiller is generally mounted on the central portion of the front module in which head lamps, a bumper beam, etc. are fitted together. Thus, when the air flap is opened, the vehicle has a driving load due to friction with the road and air resistance increasing according to the air mass flow rate. The driving load increases with increases in the vehicle speed. In contrast, the cooling load of the chiller is reduced by the air entering the chiller.

However, a control system of the related art has separately controlled the air flap and the chiller according to desired outputs and various control variables required by the vehicle and the respective devices of the vehicle. Thus, for control optimized for fuel efficiency, a system configured to control the air flap and the chiller in concert.

The control system of the related art has separately controlled the degree of opening of the AAF and the operation amount of the cooling fan with optimal values. However, since such control is performed without operating the AAF and the cooling fan in concert, the control system of the related art has performed control without reflecting both increases in the driving load caused by the vehicle speed and decreases in the cooling load. When the speed of the vehicle provided with the AAF and the cooling fan increases, the driving load caused by air resistance is also increased. In contrast, with increases in the amount of entering air, the cooling load of the air-cooled chiller is reduced. In this case, the degree of opening of the AAR should be reduced while the cooling fan should be operated.

However, it is not easy to consider this trade-off relationship, because the degree of opening of the AAF and the operation amount of the cooling fan tend to be determined as a sum of values required by the respective devices of the vehicle. For example, the degree of opening of the AAF is determined as a sum of air mass flow rates required by the respective devices according to the speed of the vehicle that generates drive power using a battery, the operation amounts of the battery, an LDC, a motor, an inverter, etc., which generate heat, the operation amount of the cooling fan cooling the heat with the air, the in-vehicle load of an air conditioning system (or a heater) operating in response to a user request, an amount of heat introduced into the vehicle, etc. In the same manner, the operation amount of the cooling fan is determined as a sum of cooling loads required by the respective devices according to the vehicle speed, the operation amounts of the heater and the cooling fan, and the refrigerant pressure of the water cooled radiator. That is, since the control system of the related art operates on the basis of the sum of the control amounts required by the respective devices, it has been difficult to consider the trade-off relationship with common control factors.

Thus, in the system for controlling an air heat exchanger of a vehicle according to an embodiment of the present disclosure, it is intended to consider the trade-off relationship by setting the control amount at which the sum of the driving load of the vehicle and the cooling load of the cooling fan in the trade-off relationship is minimum. That is, the present embodiment uses the cost function composed of the driving load and the cooling load in order to consider both the air resistance of the vehicle, which increases according to the speed of the vehicle, and the cooling load of the cooling fan disposed in the vehicle, which decreases according to the speed of the vehicle contrary to the air resistance. In this manner, the present embodiment can improve the fuel efficiency of the vehicle and improve the cooling performance of the air-cooled chiller. In addition, the present embodiment can perform control according to the current vehicle speed changing over time and the ambient temperature, thereby performing real-time control on which disturbances are reflected. Accordingly, the present embodiment can reliably perform automatic control.

Here, the environmental information may be data such as values, vectors, or matrices. In addition, the environmental information may be calculated by collecting information regarding air mass flow rates measured or obtained by the above-described respective devices, the sensors of the respective devices, the user interfaces of the respective devices, the communication part, etc., and summing all of the air mass flow rates. In case of a matrix, state values may be air mass flow rates and a driving load according to the driving of the vehicle or the air mass flow rates and a drag coefficient ca according to the driving of the vehicle.

In addition, here, the driving load includes a load according to air resistance occurring due to the driving of the vehicle. Meanwhile, the driving load may be a concept including air resistance occurring due to the driving of the vehicle, friction resistance with the road, and regenerative resistance caused by the air resistance and regenerative braking. In addition, the cooling load may be a desired output requested by the air heat exchanger. In addition, the cost function may be a sum of the driving load and the cooling load. In addition, the cost function may be a sum obtained by multiplying the driving load and the cooling load with a weight. The weight may be experimentally calculated. The weight may also be calculated by learning based on learning data of a deep learning machine. In addition, the solution of the control amount may be a solution of a differential/integral equation of the cost function or a solution of a determinant of the cost function.

In addition, the driving load may be calculated by the following Equation 1:

$$P_{driving} = \frac{1}{2}\rho C_d A V^2 + O_{th} \qquad \text{Equation 1}$$

Here, $P_{driving}$ is a driving load, p is a density of the air, $c_d$ is a drag coefficient, A is a projected area of the vehicle, V is a speed of the vehicle, and $O_{th}$ is a threshold value of the driving load. The density of the air may be determined according to the ambient temperature. The drag coefficient may be determined according to the degree of opening of the air of the air heat exchanger and the degree of opening of the air flap of the air heat exchanger.

In addition, the cooling load may be calculated by the following Equation 2:

$$P_{fan} = a\dot{m} + b\dot{m}_{air} + cV'_{spd}{}^2 + dV'_{spd} + e \qquad \text{Equation 2:}$$

Here, $P_{fan}$ is a cooling load, main is an air mass flow rate equal to or greater than a desired air mass flow, $V_{spd}$ is a speed of the vehicle, and a, b, c, d, and e are constants. In addition, $V_{spd}$ may be set to be equal to or greater than a predetermined vehicle speed. In addition, each of the constants may be determined experimentally or by a virtual simulation by setting constraints, such as a ram air mass flow rate caused by the ram air effect of the air introduced into the bumper of the vehicle according to the speed of the vehicle or a minimum output of the cooling fan.

In addition, the cost function, which is a sum of the driving load and the cooling load, may be calculated by the following Equation 3:

$$J = \sum_{k=0}^{N-1} P_{fan,k} + P_{driving,k} \qquad \text{Equation 3}$$

Here, J is a cost function, $P_{fan,k}$ is a cooling load, and $P_{driving,k}$ is a driving load. A situation where N=1 means a cost function at a current point in time at which control is performed. In addition, where N>1, J means the cost function obtained by summing all of a sum of a cooling load and a driving load at a current point in time at which control is performed and a sum of cooling loads and driving loads of future vehicle speeds during a predetermined time (i.e., a first time) after the current point in time. That is, J means the cost function as a value obtained by summing all of the sums of the cooling load and the driving load at the current point in time and the cooling loads and the driving loads at future points in time, i.e. points in time of (first time)/((k−1) points in time), where k is 0, 1, 2, . . . , and N−1. Here, the future vehicle speeds may be estimated on the basis of the environmental information of the vehicle. That is, the controller may estimate the future vehicle speeds on the basis of the tendency between a current vehicle speed and a post vehicle speed within a predetermined time. The controller may determine the future vehicle speeds using a Kalman filter algorithm.

Alternatively, in the system for controlling an air heat exchanger of a vehicle according to an embodiment of the present disclosure, the controller may further include a communication part by which sensing data regarding the surroundings of the vehicle processed by a vehicle-to-everything (V2X) application server is exchanged, and estimate a future vehicle speed on the basis of the sensing data exchanged by the communication part. That is, the controller may be an extended sensor that estimates a future vehicle speed on the basis of the communication part, by which the sensing data obtained from the surroundings of the vehicle processed by the V2X application server is exchanged, combines the future vehicle speed with the environmental information, and thus controls the air heat exchanger.

Here, V2X or a V2X application covers any communication between a vehicle and an object, e.g., a communication (V2V) between a vehicle and a vehicle, a communication (V2I) between a vehicle and an infrastructure such as an evolved Node B (eNB) or a road side unit (RSU), a communication (V2N) between a vehicle and a network, and a communication (V2P) between a vehicle and a person, such as a pedestrian possessing a pedestrian device, a bicycle rider, a vehicle driver, or a passenger. In addition, here, the sensing data obtained from the surroundings of the vehicle includes: raw data or processed data collected by sensors disposed on vehicles around the host vehicle, the global positioning system (GPS), a traffic information system, a navigation system, cameras disposed on the vehicle to collect videos, sounds, and images, etc.; and raw data or processed data collected by RSUs, pedestrian devices, etc.

For example, a camera, a light detection and ranging (LiDAR) sensor, a radar, etc. may obtain information regarding positions, distances, and relative speeds of the vehicle and objects using an image processing algorithm. In addition, the navigation system may obtain traffic information, such as lane information, road shapes, road inclinations, infrastructures, traffic lights, and traffic signs, from a navigation map database (DB) on the basis of the position information of the vehicle. In addition, the V2X application server may track the objects by determination based on learning or regulations, such as deep learning, on the based on such information, and calculate estimate paths of the objects and the vehicle and the future speed of the vehicle. In other words, the system for controlling an air heat exchanger of a vehicle according to an embodiment of the present disclosure may estimate the future vehicle speed using not only sensing data input or processed by the sensors and the like disposed on the host vehicle but also sensing data regarding the objects outside the host vehicle, the road driving environment, and estimated paths or maneuvers, exchanged by the communication part, and control the air heat exchanger using the estimated future vehicle speed.

Accordingly, the system for controlling an air heat exchanger of a vehicle according to an embodiment of the present disclosure performs the control on which disturbances may be reflected. For example, in the case of an uphill or a sudden appearance of an obstacle, it may be estimated that the future vehicle speed will be reduced over time. In this case, the driving load may be estimated to be reduced, whereas cooling load may be estimated to be increased. Accordingly, the present embodiment may control the air heat exchanger with a minimum value of the cost function on which the estimations are reflected, thereby performing optimum control on which disturbances are reflected.

In particular, the term "desired air mass flow rate" used herein is the flow rate of the air required by the heat exchanger, such as an air conditioner, a heater, a heat radiator, a chiller, or a heat pump. For example, the operation and the output of the air conditioner or the heater may be adjusted by the user interface of the vehicle, and a corresponding air mass flow rate is necessary. In addition, heat generated by the vehicle battery or the engine room may be exchanged in the chiller, heat radiator, or the heat pump, and a corresponding air mass flow rate is also necessary. Thus, the air mass flow rate necessary for such a device should be minimum, and the control amount of the air heat exchanger, at which the cost function that is the sum of the driving load and the cooling load is minimum, may be calculated under these constraints. In this manner, optimum control may be performed.

FIG. 2 is a graph illustrating the mechanism of the system for controlling an air heat exchanger of a vehicle according to an embodiment of the present disclosure. In the graph in FIG. 2, the horizontal axis indicates the degree of opening of the AAF of the air heat exchanger at a predetermined speed of the vehicle, the AAF being disposed on the side of the vehicle bumper and the radiator to adjust the flow rate of the air, whereas the vertical axis indicates loads including driving loads and cooling loads in kW at the predetermined speed of the vehicle. Here, when the vehicle speed is less than a predetermined speed, the main control may not be performed in order to reduce the amount of calculation of the control. Alternatively, when the air mass flow rate is less than the desired air mass flow rate or the degree of opening of the AAF is less than a first ratio, the main control may not be performed for the same reason.

As illustrated in FIG. 2, as the degree of opening of the AAF increases, the driving load according to the air resistance will increase but the cooling load of the cooling fan according to the air will decrease. The degree of opening of the AAF and the control amount of the operation of the cooling fan, which are minimum values of the cost function obtained simply summing the driving load and the cooling load, are determined to be solutions. Thus, the control will be performed according to the degree of opening of the AAF and the control amount of the cooling fan determined in this manner. After a predetermined time, this control is repeatedly performed. Here, the degree of opening of the AAF may be controlled as an area ratio previously set according to the angle of opening of the AAF or a duty value of a switching device configured to switch the power of the AAF. Likewise, the control amount of the cooling fan may be controlled as a rounds per minute (RPM) of the cooling fan or a duty value of the switching device.

FIG. 3 is a graph illustrating the mechanism of the system for controlling an air heat exchanger of a vehicle according to an embodiment of the present disclosure. In particular, the graph in FIG. 3 illustrates cooling loads and driving loads, with which degrees of opening of the AAF and control amounts of the cooling fan at increasing speeds of the vehicle are obtained, as well as function values of a cost function, i.e., simple sums of the cooling loads and the driving loads. As illustrated in FIG. 3, in the system for controlling an air heat exchanger of a vehicle according to an embodiment of the present disclosure, in a situation in which the vehicle speed is 50 kph, the degree of opening of the AAF is determined to be 100%, at which the cost function is minimum, and in situations in which the vehicle speed is 80 kph and which the vehicle speed is 20 kph, the degree of opening of the AAF are determined to be 60%. Meanwhile, operating speeds of the cooling fan according to the cooling load at respective speeds are determined to be 1000 RPM, 0 RPM, and 0 RPM, respectively.

FIG. 4 is a flowchart illustrating a method for controlling an air heat exchanger of a vehicle according to an embodiment of the present disclosure. Referring to FIG. 4, the method for controlling an air heat exchanger of a vehicle according to an embodiment of the present disclosure includes step S100 of measuring, by the information collector, environmental information including a current speed of the vehicle, a desired air mass flow rate, and an ambient temperature, step S200 of storing the environmental information in the storage, step S300 of calculating, by the controller, a driving load and a cooling load on the basis of the environmental information, and step S400 of calculating a control amount of the air heat exchanger, at which a cost function that is a sum of the calculated driving load and the calculated cooling load is minimum.

As illustrated in FIG. 4, in the first step S100 of the present embodiment, the information collector collects the environmental information regarding the current speed of the vehicle, the desired air mass flow rate, and the ambient temperature. As described above, the desired air mass flow rate may be measured and then calculated as an air mass flow rate required by the heat exchanger. In the second step S200, the environmental information as well as equations of the driving load and the load of the cooling fan is stored in the storage. Simultaneously, in step S202, a future vehicle speed may be calculated and estimated on the basis of a stored current vehicle speed and the environmental information. In this case, the future vehicle speed may be estimated on the basis of image data captured from the vehicle outside environment and a deep learning algorithm.

In the third step S300, the controller calculates the driving load and the cooling load on the basis of the equations and the environmental information. Here, the driving load and the cooling load may be calculated by considering the current vehicle speed or both the current vehicle speed and the future vehicle speed. In the final step S400, the controller calculates the control amount of the air heat exchanger, at which the cost function, i.e., a sum of the driving load and the cooling load is minimum, and thereby controls the respective devices. Here, the air heat exchanger may include the air flap and the cooling fan. This control may be repeated by a first threshold number. Here, the first threshold number may be a number according to a point in time up to the future vehicle speed or the control amount of the air heat exchanger, which is determined to be necessary to be controlled, or a predetermined number.

The system and method for controlling an air heat exchanger of a vehicle according to an embodiment of the present disclosure improves fuel efficiency and increases the lifespan of the air-cooled chiller by minimizing the sum of the air resistance of the vehicle, which increases according to the speed of the vehicle, and the cooling load of the cooling fan, which decreases according to the speed of the vehicle contrary to the air resistance. The control system of the related art has separately controlled the air flap and the chiller according to desired outputs and various control variables required by the vehicle and respective devices of the vehicle. Therefore, for control optimized for fuel efficiency, a system controlling the air flap and the chiller in concert is required. However, empirically, how to control the air flap and the chiller in concert in order to improve fuel efficiency is not easy. In particular, with increases in the vehicle speed, it is more difficult to find a compromise between the driving load and the cooling load, which are in the trade-off relationship. In addition, such control fails to properly reflect disturbances.

In contrast, the system and method for controlling an air heat exchanger of a vehicle according to an embodiment of the present disclosure sets the control amount at which the sum of the driving load of the vehicle and the cooling load of the cooling fan in the trade-off relationship is minimum. That is, the system and method for controlling an air heat exchanger of a vehicle according to an embodiment of the present disclosure uses the cost function composed of the driving load and the cooling load. In this manner, the system and method for controlling an air heat exchanger of a vehicle according to an embodiment of the present disclosure improves not only fuel efficiency of the vehicle but also cooling performance of the air-cooled chiller. At the same time, the system and method for controlling an air heat exchanger of a vehicle according to an embodiment of the present disclosure can perform control according to the current vehicle speed changing over time and the ambient temperature, thereby performing real-time control on which disturbances are reflected. Accordingly, the system and method for controlling an air heat exchanger of a vehicle according to an embodiment of the present disclosure can reliably perform automatic control.

Although the specific embodiments of the present disclosure have been described for illustrative purposes, those skilled in the art will appreciate that various improvements and modifications are possible, without departing from the scope and spirit of the present disclosure as disclosed in the accompanying claims.

The invention claimed is:

1. A system for controlling an air heat exchanger of a vehicle, the system comprising:
   an information collector configured to collect environmental information including a current speed of a vehicle, a desired air mass flow rate, and an ambient temperature;
   a storage configured to store the environmental information; and
   a controller configured to calculate a driving load and a cooling load in accordance with the environmental information, and to calculate a control amount of an air heat exchanger, at which a cost function that is a sum of the driving load and the cooling load is minimum;
   wherein the controller is configured to estimate a future speed of the vehicle during a first time after a current point in time in accordance with the environmental information, and is configured to calculate the control amount of the air heat exchanger, at which the sum of the cost function during the first time is minimum, in accordance with the environmental information and the future speed of the vehicle.

2. The system of claim 1, wherein the air heat exchanger comprises an air flap configured to direct or block a flow of air entering the vehicle toward a heat radiator of the vehicle and a cooling fan configured to dissipate heat from the heat radiator, and
   the controller is configured to calculate a degree of opening of the air flap and the control amount of the cooling fan.

3. The system of claim 1, wherein the controller calculates the control amount of the air heat exchanger as a duty valve of a switching device that turns power of the air heat exchanger on or off.

4. The system of claim 1, wherein, when the current speed of the vehicle is equal to or higher than a first vehicle speed, the controller calculates the control amount of the air heat exchanger.

5. The system of claim 1, wherein the controller calculates the driving load by $$P_{driving} = \frac{1}{2}\rho C_d A V^2 + O_{th}, \qquad \text{Equation 1}$$

where $P_{driving}$ is the driving load, $\rho$ is a density of the air, $c_d$ is a drag coefficient, A is a projected area of the vehicle, V is a speed of the vehicle, $O_{th}$ is a threshold value of the driving load,
and the controller calculates the cooling load by Equation 2:

$$P_{fan} = a\dot{m}_{air}^2 + b\dot{m}_{air} + cV'_{spd}^2 + dV'_{spd} + e,$$

where $P_{fan}$ is the cooling load, $m_{air}$ is an air mass flow rate equal to or greater than the desired air mass flow entering the heat exchanged in the vehicle, $V_{spd}$ is the speed of the vehicle, and a, b, c, d, and e are constants.

6. The system of claim 5, wherein the density of the air in Equation 1 is determined according to the ambient temperature, and the drag coefficient in Equation 1 is determined according to the control amount of the air heat exchanger.

7. The system of claim 5, wherein the air mass flow rate in Equation 2 is determined according to the speed of the vehicle and an operating speed of the cooling fan.

8. The system of claim 1, wherein the controller further comprises a communication part by which sensing data regarding surroundings of the vehicle processed by a V2X application server is exchanged, and
   the controller is configured to estimate a future speed of the vehicle during a first time after the current point in time in accordance with the sensing data regarding surroundings of the vehicle exchanged by the communication part, and is configured to calculate the control amount of the air heat exchanger, at which the sum of the cost function during the first time is minimum, in accordance with the environmental information and the future speed of the vehicle.

9. A method of controlling an air heat exchanger of a vehicle, the method comprising:
measuring, by an information collector, environmental information including a current speed of a vehicle, a desired air mass flow rate, and an ambient temperature;
storing the environmental information in a storage;
calculating, by a controller, a driving load and a cooling load in accordance with the environmental information; and
calculating a control amount of an air heat exchanger, at which a cost function that is a sum of the calculated driving load and the calculated cooling load is minimum;
wherein the calculation of the control amount comprises:
estimating a future speed of the vehicle during a first time after a current point in time in accordance with the environmental information; and
calculating the control amount of the air heat exchanger, at which the sum of the cost function during the first time is minimum, in accordance with the environmental information and the future speed of the vehicle.

10. The method of claim 9, wherein, in the calculation of the control amount,
the air heat exchanger comprises an air flap configured to direct or block a flow of air entering the vehicle toward a heat radiator of the vehicle and a cooling fan configured to dissipate heat from the heat radiator, and
the controller calculates a degree of opening of the air flap and the control amount of the cooling fan.

11. The method of claim 9, wherein, in the calculation of the control amount,
the controller calculates the control amount of the air heat exchanger as a duty valve of a switching device that turns power of the air heat exchanger on or off.

12. The method of claim 9, wherein, in the calculation of the driving load and the cooling load,
the controller calculates the driving load by $$P_{driving} = \frac{1}{2}\rho C_d A V^2 + O_{th}, \qquad \text{Equation 1}$$

where $P_{driving}$ is the driving load, $\rho$ is a density of the air, $c_d$ is a drag coefficient, A is a projected area of the vehicle, V is a speed of the vehicle, $O_{th}$ is a threshold value of the driving load, and
the controller calculates the cooling load by Equation 2:

$$P_{fan} = a\dot{m}_{air}^2 + b\dot{m}_{air} + cV_{spd}^2 + dV_{spd} + e,$$

where $P_{fan}$ is the cooling load, $m_{air}$ is an air mass flow rate equal to or greater than the desired air mass flow entering the heat exchanged in the vehicle, $V_{spd}$ is the speed of the vehicle, and a, b, c, d, and e are constants.

13. The method of claim 9, wherein the calculation of the control amount comprises:
estimating a future speed of the vehicle in accordance with sensing data regarding surroundings of the vehicle processed by a V2X application server; and
calculating the control amount of the air heat exchanger, at which the sum of the cost function during the first time is minimum, in accordance with the environmental information and the future speed of the vehicle.

* * * * *